(12) United States Patent
Goth et al.

(10) Patent No.: US 6,923,014 B2
(45) Date of Patent: Aug. 2, 2005

(54) SYSTEM FOR COOLING MULTIPLE LOGIC MOLECULES

(75) Inventors: Gary F. Goth, Pleasant Valley, NY (US); Daniel J. Kearney, Ulster Park, NY (US); Robert P. Makowicki, Staatsburg, NY (US); W. David McClafferty, Gardiner, NY (US); Donald W. Porter, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 10/653,633

(22) Filed: Sep. 2, 2003

(65) Prior Publication Data
US 2005/0044869 A1 Mar. 3, 2005

(51) Int. Cl.[7] ............................................. F25D 23/12
(52) U.S. Cl. ........................ 62/259.2; 62/211; 62/407; 165/80.4; 361/699
(58) Field of Search ............................... 62/259.2, 407, 62/408, 211, 210, 204; 361/699; 165/80.4, 104.33

(56) References Cited

U.S. PATENT DOCUMENTS

| 4,986,085 | A | | 1/1991 | Tischer | |
|---|---|---|---|---|---|
| 5,502,970 | A | | 4/1996 | Rajendran | |
| 5,694,782 | A | * | 12/1997 | Alsenz | 62/156 |
| 5,771,703 | A | | 6/1998 | Rajendran | |
| 5,791,155 | A | | 8/1998 | Tulpule | |
| 6,121,735 | A | | 9/2000 | Igeta et al. | |
| 6,182,742 | B1 | * | 2/2001 | Takahashi et al. | 165/104.33 |
| 6,272,870 | B1 | | 8/2001 | Schaeffer | |
| 6,595,018 | B2 | * | 7/2003 | Goth et al. | 62/259.2 |

FOREIGN PATENT DOCUMENTS

| EP | 0 148 102 A2 | 7/1985 |
|---|---|---|
| JP | 9-280696 | 10/1997 |
| JP | 11-108228 | 4/1999 |

* cited by examiner

Primary Examiner—Melvin Jones
(74) Attorney, Agent, or Firm—Floyd A. Gonzalez; Cantor Colburn LLP

(57) ABSTRACT

An exemplary embodiment is a cooling system for cooling multiple logic modules. The cooling system includes a condenser, a first electrically controlled expansion valve coupled to the condenser and a first evaporator coupled to the first electrically controlled expansion valve. A second electrically controlled expansion valve is coupled to the condenser and a second evaporator coupled to the second electrically controlled expansion valve. A controller provides control signals to the first electrically controlled expansion valve and the second electrically controlled expansion valve to control operation of the first electrically controlled expansion valve and the second electrically controlled expansion valve. A compressor is coupled to the first evaporator, the second evaporator and the condenser.

9 Claims, 2 Drawing Sheets

SYSTEM FOR COOLING MULTIPLE LOGIC MODULES

FIELD OF THE INVENTION

The present invention relates generally to cooling systems and in particular to a cooling system for cooling multiple logic modules.

BACKGROUND OF THE INVENTION

One of the factors that limit processing speed in computer systems is the generation of excessive heat at higher clock speeds. Significant gains of speed and reliability have been achieved by cooling logic modules. Cooling multiple logic modules with different heat loads to the same temperature with a single refrigeration system is a difficult task. The problem stems from the common source and sink that a single compressor/condenser provides. Various attempted solutions to this problem include using speed control, separate TX valves for the evaporator and hot gas mixing independently with each inlet. These approaches have been inadequate.

SUMMARY OF THE INVENTION

An exemplary embodiment is a cooling system for cooling multiple logic modules. The cooling system includes a condenser, a first electrically controlled expansion valve coupled to the condenser and a first evaporator coupled to the first electrically controlled expansion valve. A second electrically controlled expansion valve is coupled to the condenser and a second evaporator is coupled to the second electrically controlled expansion valve. A controller provides control signals to the first electrically controlled expansion valve and the second electrically controlled expansion valve to control operation of the first electrically controlled expansion valve and the second electrically controlled expansion valve. A compressor is coupled to the first evaporator, the second evaporator and the condenser.

DETAILED DESCRIPTION OF THE INVENTION

Figure 1:
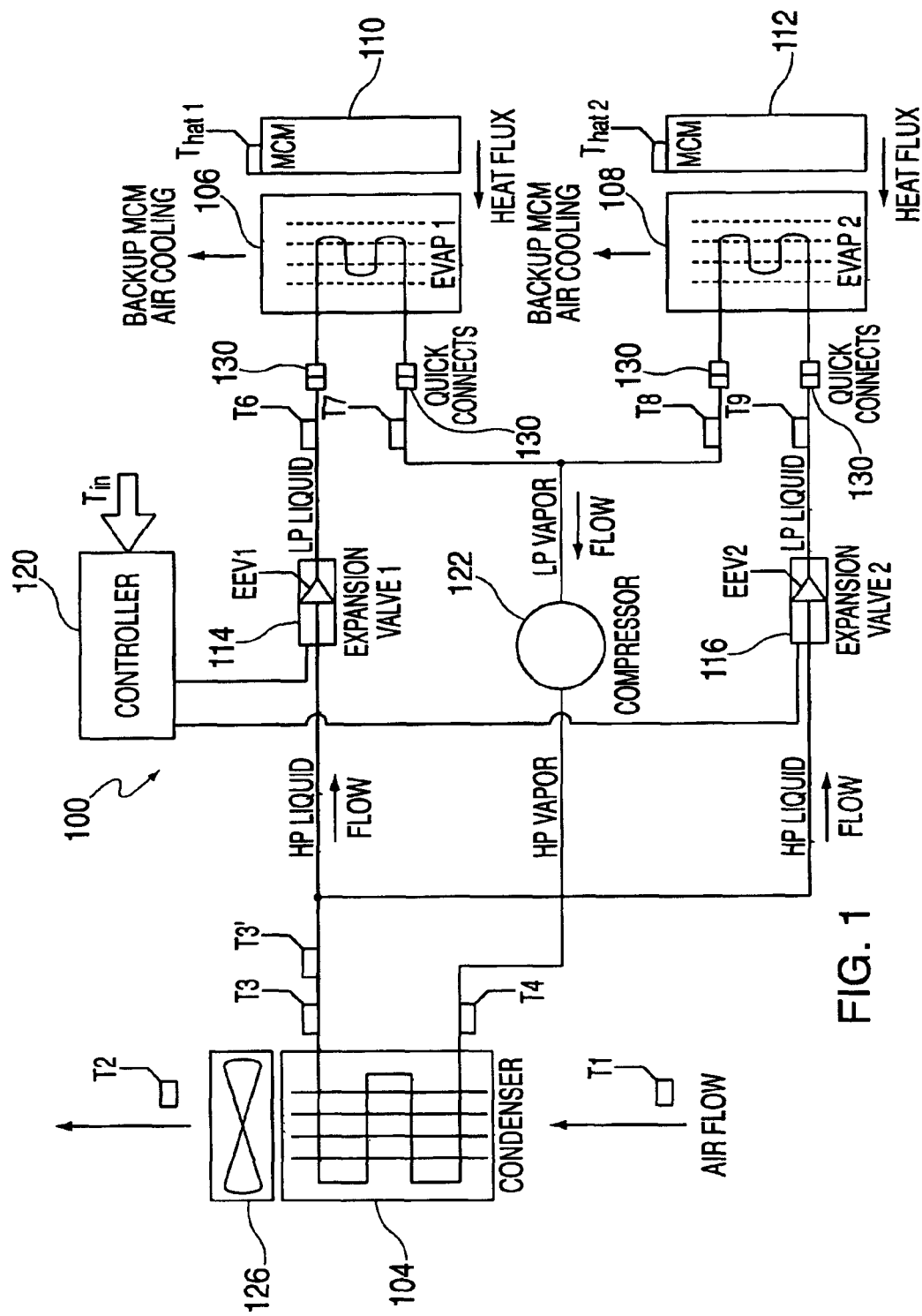
FIG. 1 depicts a cooling system in an exemplary embodiment of the invention.

FIG. 1 depicts a cooling system 100 in an exemplary embodiment of the invention. Cooling system 100 includes a condenser 104 and two evaporators 106 and 108. Evaporators 106 and 108 cool logic modules 110 and 112, respectively. Logic modules 110 and 112 are multi-chip modules (MCMs) but it is understood that other logic modules (e.g., single processors, memory) may be cooled. As used herein, logic modules is intended to include a variety of electrical components.

Both evaporators 106 and 108 are supplied refrigerant from a common condenser 104. An expansion valve 114 receives high pressure liquid refrigerant from condenser 104 and generates low pressure liquid refrigerant to evaporator 106. An expansion valve 116 receives high pressure liquid refrigerant from condenser 104 and generates low pressure liquid refrigerant to evaporator 108. Expansion valves 114 and 116 are electrically controllable. A controller 120 provides control signals to expansion valve 114 and expansion valve 116 to control refrigerant flow and pressure drop across each expansion valve. In an exemplary embodiment, expansion valves 114 and 116 includes a stepper motor the responds to control signals from controller 120. The stepper motor opens or closes an orifice in the expansion valve to regulate refrigerant flow and pressure drop. Controller 120 executes a computer program to control the expansion valves 114 and 116.

The low pressure liquid refrigerant exits expansion valves 114 and 116 and is supplied to evaporators 106 and 108, respectively. The refrigerant in each evaporator 106 and 108 is converted to low pressure vapor refrigerant and provided to a common compressor 122. High pressure vapor from compressor 122 is supplied to condenser 104. Fan 126 establishes air flow across condenser 104 to facilitate cooling the high pressure vapor refrigerant to high pressure liquid refrigerant.

A plurality of temperature sensors are distributed throughout the cooling system 100. The sensors may be thermistors or other known temperature sensors. Sensor T1 measures air temperature entering condenser 104. Sensor T2 measures air temperature exiting condenser 104. Sensors T3 and T3' provide redundant measurement of refrigerant temperature exiting condenser 104. Sensor T4 measures refrigerant temperature entering condenser 104. Sensor T6 measures refrigerant temperature entering evaporator 106 and sensor T7 measures refrigerant temperature exiting evaporator 106. Sensor T8 measures refrigerant temperature entering evaporator 108 and sensor T9 measures refrigerant temperature exiting evaporator 108. Sensor That1 measures temperature at logic module 110 and sensor That2 measures temperature at logic module 112.

Each temperature sensor generates a temperature signal which is supplied to controller 120 and shown as Tin. The controller 120 adjusts the expansion valves 114 and/or 116 in response to one or more of the temperature signals to maintain the logic modules 110 and 112 at a predefined temperatures. Controller 120 controls expansion valves 114 and/or 116 to obtain desired superheat values while maintaining each logic module at a desired temperature. Each logic module 110 and 112 may be maintained at a different temperature or the same temperature, even if each logic module has different heat loads.

Evaporators 106 and 108 may be connected to the refrigerant supply and refrigerant return lines through quick disconnect connectors 130. The controllable expansion valves 114 and 116 allow an evaporator to be removed for maintenance or upgrade while the other evaporator, condenser and compressor continue to operate. For example, expansion valve 114 can be closed and the refrigerant from evaporator 106 removed by the suction of compressor 122. Evaporator 106 can then be removed for service, upgrade, etc.

Figure 2:
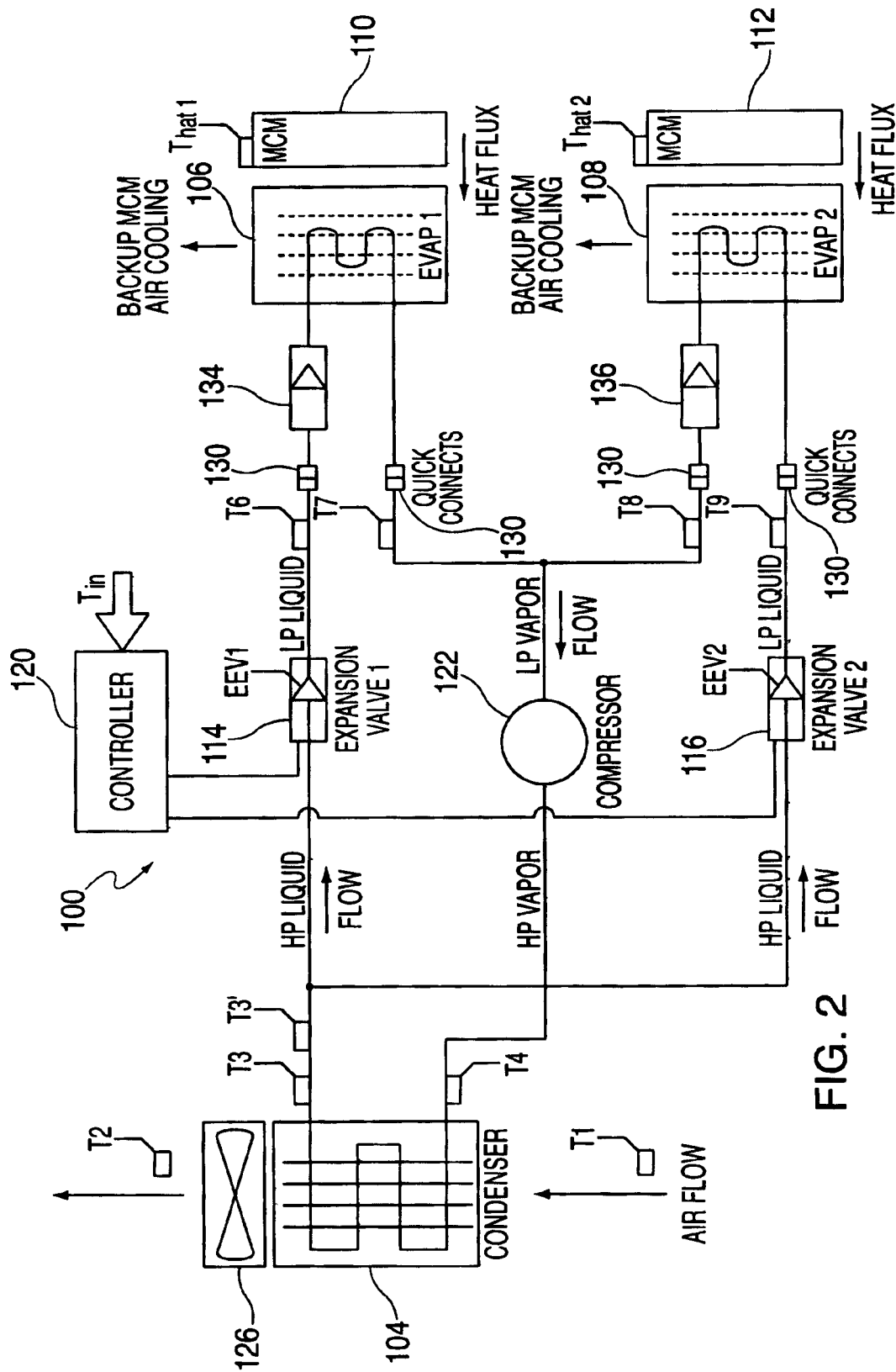
FIG. 2 depicts a cooling system in another exemplary embodiment of the invention.

FIG. 2 shows an alternate embodiment in which the refrigerant supply lines to evaporators 106 and 108 includes a secondary expansion valve 134 and 136, respectively. Secondary expansion valves 134 and 136 may be implemented using a fixed orifice valve or cap tube. This divides the expansion of the refrigerant across two locations and allows the electrically controlled expansion valves 114 and 116 to have enhanced granularity. This also prevents the supply lines to evaporators 106 and 108 from getting too cold.

The electrically controlled expansion valves 114 and 116 may be located in a modular refrigeration unit (MRU) that includes the condenser 104, compressor 122 and controller 120. The secondary expansion valve 134 and 136 may be located close to evaporators 106 and 108, respectively. This aids in controlling the temperature of the logic modules, reduces space required for insulating the supply lines to the evaporators and reduces waste heat.

Although two evaporators are shown connected to one MRU (condenser, compressor, expansion valves and controller), it is understood that more then two evaporators may be coupled to each MRU.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore, it is intended that the invention not be limited to the particular embodiments for carrying out this invention, but that the invention will include all embodiments falling within the scope of the appended claims.

What is claimed is:

1. A cooling system for cooling multiple logic modules, the cooling system comprising:
   a condenser;
   a first electrically controlled expansion valve coupled to said condenser;
   a first evaporator coupled to said first electrically controlled expansion valve;
   a second electrically controlled expansion valve coupled to said condenser;
   a second evaporator coupled to said second electrically controlled expansion valve;
   a controller providing control signals to said first electrically controlled expansion valve and said second electrically controlled expansion valve to control operation of said first electrically controlled expansion valve and said second electrically controlled expansion valve;
   a compressor coupled to said first evaporator, said second evaporator and said condenser.

2. The cooling system of claim 1 wherein:
   said controller controls refrigerant flow and pressure drop in said first electrically controlled expansion valve and said second electrically controlled expansion valve.

3. The cooling system of claim 1 further comprising:
   at least one temperature sensor providing a temperature signal to said controller, said controller generating said control signals in response to said temperature signal.

4. The cooling system of claim 3 wherein:
   said at least one temperature sensor includes a plurality of temperature sensors.

5. The cooling system of claim 4 wherein:
   said plurality of temperatures sensors include a first temperature sensor providing a temperature signal indicative of temperature at one logic module and a second temperature sensor providing a temperature signal indicative of refrigerant temperature.

6. The cooling system of claim 1 further comprising:
   a first secondary expansion valve coupled between said first electrically controlled expansion valve and said first evaporator.

7. The cooling system of claim 6 further comprising:
   a second secondary expansion valve coupled between said second electrically controlled expansion valve and said second evaporator.

8. The cooling system of claim 6 wherein:
   said condenser, said first electrically controlled expansion valve, said second electrically controlled expansion valve, said compressor and said controller are contained within a modular refrigeration unit, and
   said first secondary expansion valve is positioned proximate to said first evaporator.

9. The cooling system of claim 1 wherein:
   said first electrically controlled expansion valve includes a stepper motor that opens or closes an orifice in response to said control signals.

* * * * *

UNITED STATES PATENT AND TRADEMARK OFFICE
CERTIFICATE OF CORRECTION

PATENT NO. : 6,923,014 B2
DATED : August 2, 2005
INVENTOR(S) : Goth et al.

It is certified that error appears in the above-identified patent and that said Letters Patent is hereby corrected as shown below:

Title page,
Item [54], Title, after "LOGIC" delete "MOLECULES" and insert -- MODULES --.

Signed and Sealed this

Seventh Day of February, 2006

JON W. DUDAS
*Director of the United States Patent and Trademark Office*